United States Patent [19]

Schneider et al.

[11] Patent Number: 4,630,377
[45] Date of Patent: Dec. 23, 1986

[54] VALVE SEAT RUNOUT GAGE

[75] Inventors: Michael H. Schneider, Chesterfield; Thomas J. Chadwell, Warson Woods, both of Mo.

[73] Assignee: Sunnen Products Company, St. Louis, Mo.

[21] Appl. No.: 788,492

[22] Filed: Oct. 17, 1985

[51] Int. Cl.4 ............................................. G01B 5/24
[52] U.S. Cl. ................................. 33/181 AT; 33/543
[58] Field of Search .......... 33/180 R, 180 AT, 181 R, 33/181 AT, 542, 543, 544, 550, 552, 172 R

[56] References Cited

U.S. PATENT DOCUMENTS 2,557,840  6/1951  Preslan ........................... 33/181 AT
2,739,389  3/1956  Carter .................................... 33/543
2,765,539 10/1956  Sear ................................. 33/181 AT Primary Examiner—Harry N. Haroian
Attorney, Agent, or Firm—Haverstock, Garrett & Roberts

[57] ABSTRACT

A gage for indicating the runout condition of a valve seat edge formed by and between adjacent surfaces of a valve seat adjacent one end of a valve guide bore and concentric with the axis thereof, the valve guide bore accommodating an elongated pilot member that extends therefrom through the valve seat surfaces. The gage comprises a housing member adapted to be mounted on the pilot member in fixed spaced relationship from the valve seat and having a dial indicator mounted thereon at a location spaced radially from the pilot member, and a work engaging member mounted for rotatable and axial movement on the pilot member in the space between the housing and the valve seat. The dial indicator has a plunger member extending therefrom substantially parallel to the pilot member and an indicator needle operatively connected to the plunger member and movable in response to movements of the plunger member to produce a visual indication as to the position of the plunger member. The work engaging member includes an annular portion and an elongated member mounted thereon at an angle for slidable engagement with the valve seat edge whose runout is to be indicated, and a second portion including an end face slidably engageable with the plunger member whereby rotation of the work engaging member when the elongated member is engaged with the valve seat edge translates into movements of the plunger member to produce indications on the dial indicator as to the runout of the valve seat edge.

13 Claims, 3 Drawing Figures

VALVE SEAT RUNOUT GAGE

BACKGROUND OF THE INVENTION

The present invention relates generally to a valve seat runout gage, and, more particularly, to a gaging device including means to accurately indicate the runout characteristic of a seating edge formed by the intersection of two annular tapered valve seat surfaces, which valve seats are commonly associated with the piston cylinders of internal combustion engines and the like.

DESCRIPTION OF THE RELATED ART

An operator who is reconditioning a valve seat in an internal combustion engine and like devices may desire or find it necessary to be able to detect the amount of eccentricity or objectionable runout of a valve seat surface; that is, to determine the extent to which the valve seat surface is eccentric with respect to a center point such as the axis of an associated valve guide about which valve guide axis the valve seat surface is preferably concentric. The reconditioning process includes machining or grinding the surfaces which form the valve seats. The machining and grinding operations can, because of various machining errors, result in objectionable runout or an out-of-round condition between the valve seat surface and an associated valve guide. The accuracy of the runout characteristics of a reconditioned valve seat is important to maintain the operating efficiency of the engine, so important in fact that even small amounts of runout error in a valve seat surface will create a poor seating condition for a valve that reciprocates in the valve guide associated with the valve seat. When the valve seats against the valve seat, runout errors in the valve seat surface create leakage and loss of compression in the associated cylinder which will adversely affect engine efficiency and will cause valve and valve seat wear and deterioration, as well as increase pollutant emissions.

Many valve seats are formed by three adjacent surfaces, namely, topping, seat face, and throat surfaces, all of which are at different angles. Each of the three tapered valve seat surfaces is ideally concentric with respect to the longitudinal axis of the associated valve guide to achieve optimum operating efficiency of an engine. As the engine operates, the valve reciprocates in the associated valve guide bore so that a tapered undersurface of the valve preferably only contacts a peripheral edge of the seat face surface of the valve seat. The peripheral or seating edge is formed by the intersection between the topping and seat face surfaces in a three-surface valve seat, or the outer edge of the seat face surface in valve seats having other than three surfaces. It is therefore obviously important that the seating edge of the seat face surface be concentric with respect to the axis of the valve guide so that the valve's undersurface circumferentially seats against the seating edge all the way around in order to prevent leakage and loss of compression in the associated piston cylinder.

Known valve seat runout gages have enabled persons including mechanics to determine the runout or eccentricity but only of one or more of the different angularly related valve seat surfaces, as distinguished from determining the runout of a seating edge formed by and between adjacent surfaces of a valve seat. Typical of prior art devices that are used to determine the runout of valve seat surfaces are the constructions disclosed in Preslan U.S. Pat. No. 2,557,840 and in Jordan et al U.S. Pat. No. 3,534,480.

Known gage constructions for the most part are incapable of detecting runout in an edge as distinguished from a surface because the contact elements of the known constructions which bear against the surface being evaluated are unable, because of their construction, to maintain contact with an edge as distinguished from a surface. Furthermore, because of the construction of the surface engaging members the known work engaging members are incapable of being used to engage surfaces of valve seats of different diameters. Known gage constructions having such contact elements are disclosed in U.S. Pat. Nos. 2,557,840 and 3,534,480.

The present runout gage construction overcomes these and other disadvantages and shortcomings of the known prior art, and represents a substantial improvement over the prior art constructions. This in part is because the present gage includes means to indicate the runout of a seating edge as distinguished from a seat face surface, and it includes means to indicate runout inaccuracies in such a way that the operator using the present gage knows the extent of the runout error. Knowing this, the operator is then able, using an appropriate grinding tool, to improve the concentricity of the seating edge by further machining or grinding the valve seat surfaces which form the edge to complete the reconditioning process. Contacting an edge between adjacent seat surfaces also provides a much more accurate way to detect grinding errors than is true of known devices that contact a seat surface at some intermediate location thereon.

The present gage construction responds to runout in the seating edge between valve seat surfaces because it includes an elongated rod-like member that is set at an angle intermediate between the angles of the adjacent seat surfaces that form the edge that is engaged thereby and therefore is easily maintained in contact with the edge in all positions thereof. The rod member, which is relatively long compared to the seating edge, represents an improvement over the seat surface contact elements of the prior art constructions. The prior art surface contact elements are typically spherical or pointed members which are able to be maintained in contact with the relatively wide valve seat surfaces but would be impractical to use to try to maintain contact with a seating edge formed by and between adjacent valve seat surfaces. The construction of the contact rod of the present device enables it to be operatively maintained in contact with the seating edge of a valve seat regardless of runout error because the contact surface of the contact rod is relatively long at the place of contact. Furthermore, the contact rod can be relatively long so as to be able to contact valve seat edges between similarly beveled seat surfaces of widely varying diameter thereby facilitating using the same contact member to indicate runout for many different valve seat diameters. This is an important advantage.

The present contact rod construction is additionally advantageous because it preferably closely approximates but differs from the angular orientation of one of the seating surfaces that form the edge it engages and this enables the present gage construction to be used to very accurately indicate the concentricity of and any imperfections in the peripheral edge of a seat face surface in question and under conditions very similar orientation-wise to those encountered by the tapered undersurface of a valve when it seats against the valve seat edge during operation of an engine. Furthermore, the present gage construction is adapted to be able to be used with rod members oriented to engage edges at different orientations including also to engage valve seat edges for valve seats having other than three valve seat surfaces.

SUMMARY OF THE INVENTION

The present valve seat runout gage construction provides means to functionally and accurately indicate the runout of valve seat surfaces including to indicate an out-of-round condition thereof and the extent of the out-of-round condition. Additionally, the present gage construction enables an operator to use the same gage with valve seats having many different diameters to facilitate the reconditioning of valve seats so as to improve the seating and sealing characteristics between the valve seat and an associated valve.

A principal object of the present invention is to provide improved and more accurately formed valve seats in internal combustion engines and like devices.

Another object is to provide a valve seat runout gage that is relatively simple and inexpensive to manufacture and yet highly accurate.

Another object is to provide improved and more accurate means for indicating the condition of valve seat surfaces during grinding thereof.

Another object is to provide a valve seat runout gage that is relatively easy to use.

Another object is to provide means to enable even relatively unskilled persons to be able to accurately recondition valve seats.

Another object is to provide a runout gage that is relatively rigid, trouble-free and has few wear parts.

Another object is to provide a gage for indicating the runout characteristics of edges formed by and between adjacent valve seat surfaces.

Another object is to provide a runout gage having a work engaging contact member that operatively contacts a seating edge formed by and between adjacent valve seat surfaces.

Another object is to provide an improved long-life and trouble-free contact member for engaging a valve seat edge to indicate the runout characteristics thereof.

Another object is to provide a runout gage that indicates runout characteristics of seating edges of valve seats by means which engage the valve seat at an angle similar to the angle that a valve member engages the valve seat.

Another object is to provide a gage that has means movable about an edge formed by and between adjacent valve seat surfaces instead of engaging only one of the valve seat surfaces.

These and other objects and advantages of the present invention will become apparent to those skilled in the art after considering the following detailed specification of a preferred embodiment of the present construction in conjunction with the accompanying drawings.

DETAILED DESCRIPTION OF A PREFERRED EMBODIMENT

Figure 1:
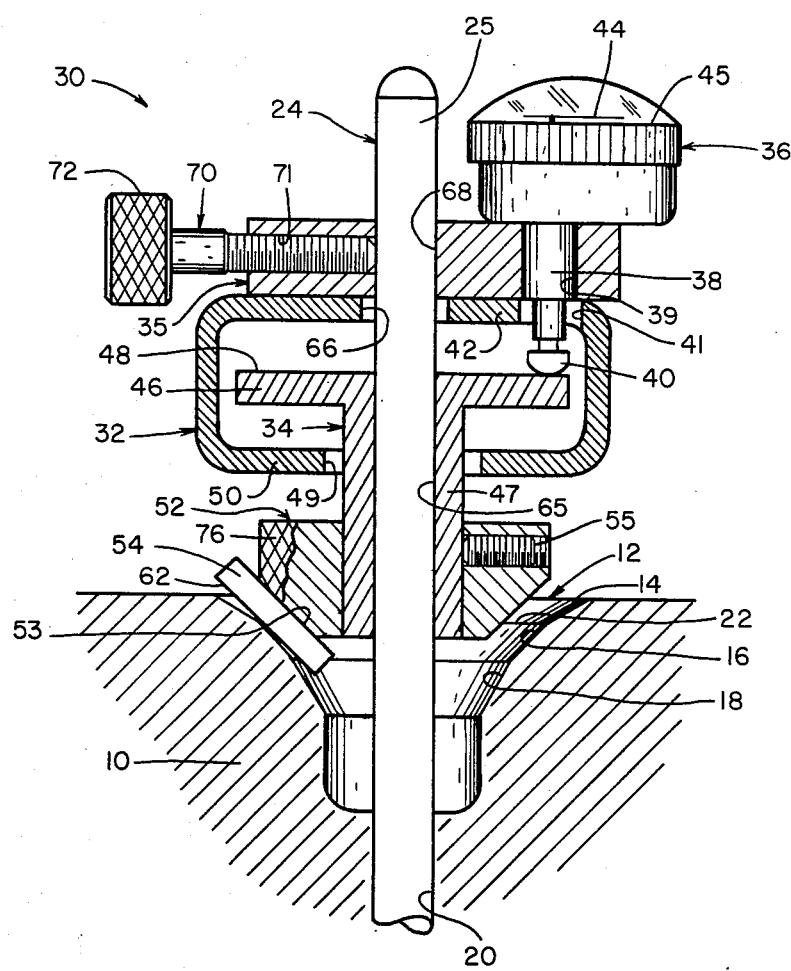
FIG. 1 is a cross-section elevational view through the center of a preferred embodiment of a valve seat runout gage constructed according to the present invention, this gage being shown supported on a pilot member positioned extending into a valve guide bore.

Referring to the drawings more particularly by reference numbers wherein like numbers refer to like parts, number 10 in FIG. 1 refers to an engine head or block 10 having a valve seat 12 to be ground and gaged. The valve seat 12 is shown formed by three adjacent annular seat surfaces 14, 16 and 18 and can be associated with an inlet port or an exhaust port of an internal combustion engine or like device. The valve seat 12 surfaces are sometimes identified as the outer or topping surface 14, the central or seat face surface 16, and the inner or throat surface 18. Valve seats may have different numbers of annular tapered surfaces, and the present gage can be used to indicate the runout of such valve seats as well. The topping surface 14 in the three-surface valve seat 12 is oriented at a relatively steep angle such as at an angle of 60° or 75° with respect to the axis of the seat including also the axis of valve guide bore 20 associated therewith. Typically, the seat surface 16 is oriented at a shallower angle than the topping surface 14 such as at an angle of 30° or 45° with respect to the valve guide axis, and the throat surface 18 is oriented at a still shallower angle as compared to the other two surfaces, such as at an angle of 15° or 30° to the same axis.

An intersection or seating edge 22 is formed by and between the topping surface 14 and the seat face surface 16, and it is highly desirable to have the seating edge 22 as well as the surfaces which form the edge 22 concentric with respect to the axis of valve guide 20 in order to provide the most efficient seal between a seating surface of a valve and the valve seat. The term concentric as used herein refers to the fact that the edge 22 should ideally be round and centered on the axis of the valve seat 12. When this is true, which occurs when the valve seat surfaces 14 and 16 are accurately ground, there will be little or no runout indicated when the subject gage is used.

Figure 3:
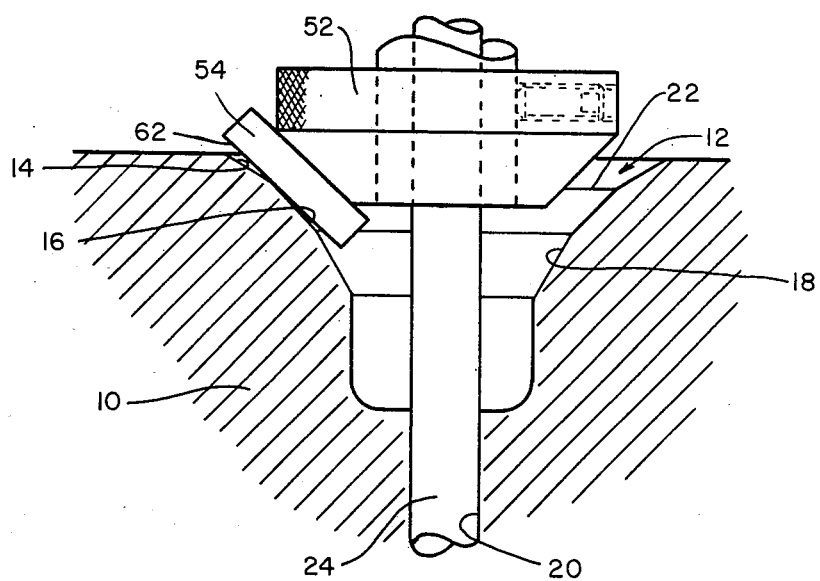

Generally, when an engine repair person in an automotive repair shop reconditions an engine, he grinds the surfaces of one or more of the valve seat surfaces using a valve seat grinding tool such as, for example, the tool disclosed in U.S. Pat. No. 4,467,566, which is assigned to Applicants' assignee. This usually involves grinding each of the surfaces 14, 16 and 18 separately using different abrasive members on the same tool to grind each of the surfaces. To do this, a pilot member or stem 24 (FIGS. 1 and 3) is positioned in the valve guide bore 20 of each seat to be ground so that the axes of the pilot 24 and the valve guide 20 coincide, and serves as a guide for the grinding tool and for the subject gage 30. The pilot 24 has a cylindrical upper portion 25 which operatively supports and positions the grinding tool (not shown) and the present gage 30 during the grinding and gaging operations.

The present invention is directed to the novel construction of the runout gage 30 that makes use of the same pilot 24 in its operation and is used to indicate to the operator the amount of runout error or out-of-roundness of the seating edge 22. This means that with the present gage 30 the operator can grind one or more of the surfaces 14, 16 and 18 of the various valve seats 12 to be ground and can then quickly and accurately determine if the grinding operations have created any out-of-round condition, and if so, the amount of the out-of-roundness. If an imperfection such as an out-of-round edge condition is observed using the present gage 30, the gage 30 can be removed from the pilot stem 24 and the grinding tool repositioned thereon to correct the observed out-of-roundness. This can be rechecked using the same gage 30 until the valve seat 12 is accurate. The entire grinding and gaging procedure usually only takes a few minutes and can be repeated as often as necessary to achieve the desired result.

The present valve seat runout gage 30, shown in FIG. 1, is shown including a retainer housing 32 with a bushing member 34 that is positioned concentrically with the housing 32 and is axially and rotatably movable relative to housing 32. The retainer housing 32 has a mounting portion or base 35 that is fixedly attached to the top thereof as shown in FIG. 1 which is used for securing the gage housing 32 to the pilot 24, as will be explained.

A dial indicator assembly 36 is positioned on the base 35 and has a leg portion 38 that extends through opening 39 in the mounting base 35. The dial indicator 36 also has a movable plunger 40 that extends through the leg portion 38 and through an opening 41 in an upper housing wall 42. The plunger 40 is shown movable vertically during operation and is operatively connected to an indicator needle 44 in the dial indicator 36. The dial indicator 36 is shown as being a mechanical-type dial indicator but it could be an electronic indicator as well. The dial indicator 36 includes an indicator portion that has an upper surface 45 with a scale (not shown) thereon, and the indicator needle 44 is rotatively mounted in the indicator 36 and moves or rotates relative to the scale in response to axial movements of the plunger 40. The scale or other indicia (not shown) on the surface 45 enables an operator to obtain an indication as to the amount, location and extent of the needle movement, all of which are an indication as to the accuracy of the valve seat surfaces or edges and particularly the accuracy of the surfaces 14 and 16 and of the edge 22 formed therebetween.

The bushing 34 has a tubular shape sleeve portion 47 which is sized to just receive the pilot 24, and the bushing 34 has a relatively wide shoulder flange 46 attached to or integrally formed at the upper end of the sleeve 47. The flange 46 has an upper surface 48 that is accurately formed so that when the gage 30 is operatively positioned on the pilot 24, the surface 48 is engaged by the plunger 40 in the same extended position thereof in all positions of the flange 46 relative to the plunger 40 if the edge being gaged is accurate or concentric. In the usual situation the surface 48 will be a polished surface to minimize friction and will extend precisely at right angles to the axis of the pilot 24 and the valve seat 12. This is not an essential condition, however, as long as the area of the surface 48 that is in contact with the plunger 40 is such that the plunger 40 shows no vertical movement when the bushing 34 is rotated in a perfectly formed valve seat. The plunger 40, as noted, is biased into operative contact with and is responsive to axial movement of the surface 48 when using the gage.

The flange 46 and the upper end portion of bushing 34 are shown positioned for movement within retainer housing 32, while a lower portion of the bushing 34 extends through an oversized bore 49 in a lower housing wall 50 such that the bushing 34 is freely rotatable in and axially movable relative to the housing 32. A rotatable member 52 is fixedly attached to the lower end of the sleeve 47 at a location spaced below the housing 32. The member 52 is shown annular in shape and has a beveled lower surface 53 to which is attached an elongated work-engaging rod 54. The angular orientation of the surface 53 and of the rod 54 attached thereto is such that a lower surface 62 of the rod 54 will contact the seating edge 22 of the valve seat 12 at a desired angle during a gaging operation as shown in FIG. 1. The rod 54 can be adhesively or otherwise attached to the base member 52 and the precise angular orientation of the rod 54 is extremely important to the invention. The rod 54 should also preferably be constructed of a relatively hard, wear-resistant material such as tungsten carbide or hardened steel. Since an operator may desire to replace the member 52 with other similar members for gaging differently oriented valve seat edges, the base 52 is made to be demountably coupled to sleeve 47, being secured thereto by a threadable set screw 55 or by other similar means.

Figure 2:
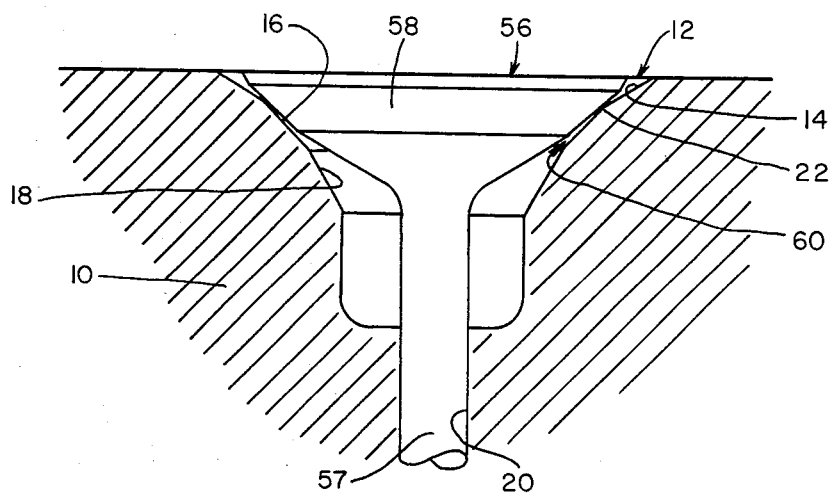
FIG. 2 is an enlarged fragmentary cross-sectional view showing a valve member in seated engagement with an edge of a valve seat; and, FIG. 3 is an enlarged fragmentary cross-sectional view showing the work-engaging portion of the present runout gage in contact with an edge formed by and between adjacent valve seat surfaces.

To understand the important features of the gage 30, it is necessary to understand the operation of a valve 56 in an internal combustion engine as shown in FIG. 2. The valve 56 reciprocates as the engine operates with a valve stem 57 moving back and forth in the valve guide bore 20. In so doing, the radially extended head portion of valve 56 alternately engages and disengages the valve seat 12 preferably by a valve undersurface 58 seating against seating edge 22 as shown in FIG. 2. When valve 56 is in the seated position shown in FIG. 2, the tapered valve seating surface 58 of the valve 56 engages the seating edge 22 as opposed to seating flush against any one of the surfaces of valve seat 12. The seating surface 58 in the seated position of valve 56 typically is oriented to be at an angle of approximately one degree (1°), sometimes called an "interference angle", with respect to the seat face surface 16. This means there will be a slight space 60 between the seating surface 58 and the seat face surface 16 remote from the edge 22 when the seating surface 58 is seated in contact with seating edge 22. This minimal operative contact between the seating edge 22 and the seating surface 58 reduces wear and deterioration of the valve seat 12 and of the valve 56 while at the same time the contact between the valve 56 and the valve seat 12 is sufficient to close off and seal between the valve 56 and the valve seat 12. In valve seats formed by other than three adjacent surfaces, the seating surface 58 contact will be similar.

This brief description of the cooperation between the valve 56 and the valve seat 12 demonstrates the importance of properly reconditioning the valve seats 12 so that their seating edges 22 are concentric with respect to the axes of valve seat 12 and valve guide 20 and this can only occur if the valve seat surfaces 14 and 16 are ground accurately. An eccentric or out-of-round seating edge 22 will cause incomplete seating of the valve 56 against the valve seat 12, thereby resulting in leakage and loss of compression and also causing premature wear and deterioration of the valve and valve seat elements. The present gage 30, unlike all of the known prior art gage constructions, provides a contact member, namely, the work-engaging rod member 54, which operatively contacts the seating edge 22 (FIGS. 1 and 3) as opposed to one of the valve seat surfaces, under conditions that closely approximate the seating conditions encountered by the valve surface 58 when it seats against the seating edge 22 (FIG. 2).

Operating the gage 30 is relatively easy and can be quickly learned even by a relatively unskilled person such as a mechanic trainee. The gage 30 is mounted on the pilot 24 which was previously positioned in the valve guide 20, such that the upper cylindrical portion 25 of the pilot 24 extends through a bushing bore 65, an oversized housing opening 66, and through a bore 68 in the mounting base 35. The retainer housing 32 is fixedly secured to pilot 24 by threadedly tightening a clamping bolt 70 located in a threaded bore 71 in the base 35. The clamping bolt 70 is shown having a knurled head portion 72 to facilitate grasping and tightening the bolt 70. It is important to fixedly secure the housing 32 before operating the gage 30 so that the plunger 40 is maintained stationary while the bushing 34 including the flange 46 are rotated by the operator. This arrangement enables an operator to accurately observe the stationary dial indicator 36 while rotating the member 52 with the rod 54 in contact with the seating edge 22. The only movement that will be communicated to the dial indicator 36 will be movements of the plunger 40 effected by axial movements of the surface 48 that are due to out-of-roundness or eccentricity of the edge 22. If there is no out-of-roundness of the edge 22 there will be no resultant movement of the plunger 40. By the same token, the greater the out-of-roundness of the edge 22 the greater will be the amount of plunger movement.

It is an easy matter for the operator, once the gage 30 is locked into position on the pilot 24, to rotate the member 52 to gage the surface. This is done by the operator grasping a knurled peripheral surface 76 of the member 52 and thereby rotating the member 52 about the pilot stem 24. Rotating the member 52 rotates the work-engaging rod 54 and the flange 46, and if any runout errors are present in the edge 22 they will show up as deflections of the indicator needle 44. This will occur because of axial deflections of the bushing 34 and of the flange 46 against which the plunger 40 is biased. The axial movements of the plunger 40 translate into arcuate movements of the indicator needle 44 relative to the surface 45. The speed of rotation of the base 52 is at the convenience of the operator but should be fast enough to indicate any out-of-roundness condition by movements of the needle 44. When the operator notices movements of the needle 44 that exceed some preselected minimum, he will know that additional grinding is necessary. It is even possible to locate the areas of the imperfections using the subject gage, but this is usually not necessary because the grinding operation is uniform around the surfaces being ground.

The means for translating axial movements of the plunger 40 into arcuate movement of the indicator needle 44 may include known gage translation means and are not per se part of the present invention.

Although the present valve seat runout gage 30 can be conveniently used to determine the runout conditions of each of the plurality of valve seats in a typical internal combustion engine, it is contemplated that an operator may become fairly skilled at grinding and gaging valve seats and as his skill increases the need to gage every seat may diminish. However, the present gage will enable an operator to develop the required skills and is especially important for training new personnel and as a periodic check even for skilled persons.

Thus there has been shown and described a novel and nonobvious valve seat runout gage which fulfills all of the various objects and advantages sought therefor. It will be apparent to those skilled in the art, however, that many changes, modifications, variations, and other uses and applications of the subject gage construction, in addition to those which have been disclosed, are possible and contemplated. All changes, modifications, variations, and other uses and applications which do not depart from the spirit and scope of the invention are deemed to be covered by the invention, which is limited only by the claims which follow.

What is claimed is:

1. A gage for indicating the runout condition of a valve seat edge formed by and between adjacent valve seat surfaces of a valve seat adjacent one end of a valve guide bore and concentric with the axis thereof, the valve guide bore accommodating an elongated pilot member that extends therefrom through the valve seat surfaces, said gage comprising a housing member adapted to be mounted on the pilot member in fixed spaced relationship from the valve seat, dial indicator means mounted on the housing at a location spaced radially from the pilot member, said dial indicator means having a plunger member extending therefrom substantially parallel to the pilot member and indicator means operatively connected to the plunger member and movable in response to movements of the plunger member to produce a visual indication as to the position of the plunger member, a work engaging member mounted for rotatable and axial movement on the pilot member in the space between the housing and the valve seat, said work engaging member including an annular portion and an elongated member mounted thereon at an angle for slidable engagement with the valve seat edge whose runout is to be indicated, said work engaging member having a second portion including an end face slidably engageable with the plunger member whereby rotation of the work engaging member when the elongated member is engaged with the valve seat edge translates into movements of the plunger member to produce indications as to the runout of the valve seat edge on the dial indicator means.

2. The gage of claim 1 wherein the elongated member engageable with the valve seat edge is formed of a relatively hard, wear-resistant material.

3. The gage of claim 1 wherein the second portion of the work engaging member includes an annular flange attached to a tubular member rotatably and axially movable on the pilot member.

4. The gage of claim 1 wherein the elongated member is angularly oriented on the work engaging member to extend closer to one of the valve seat surfaces that forms the edge than to the other.

5. The gage of claim 1 wherein the dial indicator means includes a mechanical dial indicator operatively connected to the plunger member.

6. The gage of claim 1 wherein the dial indicator means includes a rotatable pointer operatively connected to the plunger member and a graduated scale adjacent to the rotatable pointer.

7. The gage of claim 1 wherein the second portion of the work engaging member engageable by the plunger member has a relatively smooth annular surface slidably engageable by the plunger member.

8. The gage of claim 7 wherein the plunger member is biased outwardly into engagement with the relatively smooth annular surface.

9. A gaging device for indicating imperfections in valve seat surfaces and particularly in edges formed by and between adjacent valve seat surfaces in engine blocks and the like, the engine blocks having valve guide bores the axes of which extend through respective valve seat surfaces and a pilot member for positioning in the valve guide bores having a portion thereof that extends from the valve seat surfaces, the gaging device comprising a support member having a bore therethrough for receiving the pilot member therethrough, means on said support member for fixedly mounting the support member to the pilot member, a dial indicator mounted on the support member having a movable pointer mounted therein and a plunger member operatively connected to the movable pointer, said plunger member being oriented substantially parallel to the axis of the pilot member, a work engaging assembly having a bore therethrough for slidably and rotatably cooperating with the pilot member, said work engaging assembly having an end face for slidable engagement with the plunger member and a portion spaced from the end face for movement adjacent to the valve seat surfaces that form the edge to be checked for imperfections, and a work engaging member mounted on said assembly portion having an elongated work engaging surface oriented thereon for engaging a valve seat edge to be checked.

10. The gaging device of claim 9 wherein the work engaging member engageable with the valve seat edge is formed of a relatively hard, wear-resistant material.

11. The gaging device of claim 9 wherein the work engaging surface is angularly oriented on the work engaging member to extend closer to one of the valve seat surfaces that forms the edge than to the other.

12. The gaging device of claim 9 wherein the dial indicator means includes a mechanical dial indicator operatively connected to the plunger member.

13. The gaging device of claim 9 wherein the dial indicator means includes a rotatable pointer operatively connected to the plunger member and a graduated scale adjacent to the rotatable pointer.

* * * * *